April 17, 1962 F. P. SHARPE 3,029,498
BEARING CUP ASSEMBLING MACHINE
Original Filed April 8, 1957 4 Sheets-Sheet 2

INVENTOR.
FREDERICK P. SHARPE
BY
Whittemore, Hulbert & Belknap
ATTORNEYS

INVENTOR.
BY FREDERICK P. SHARPE
Whittemore,
Hulbert & Belknap
ATTORNEYS

April 17, 1962 F. P. SHARPE 3,029,498
BEARING CUP ASSEMBLING MACHINE
Original Filed April 8, 1957 4 Sheets-Sheet 4
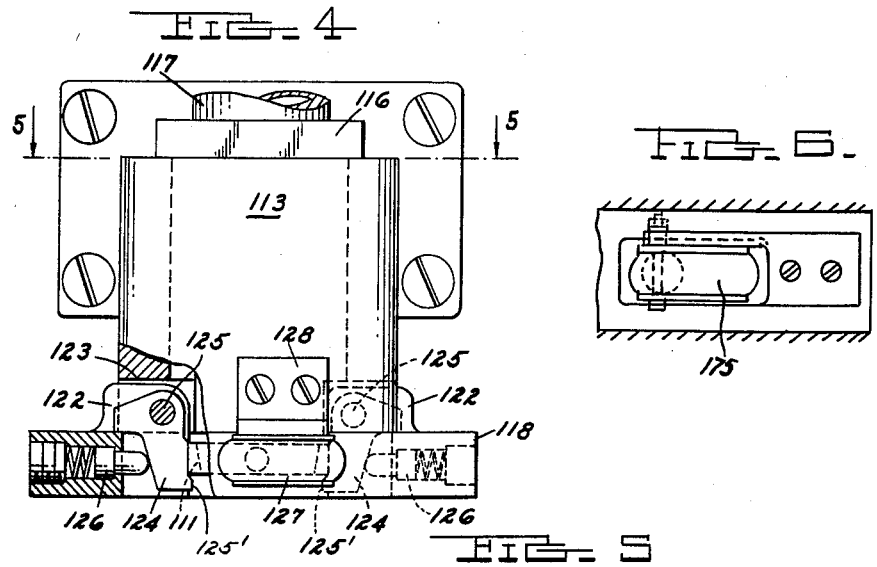
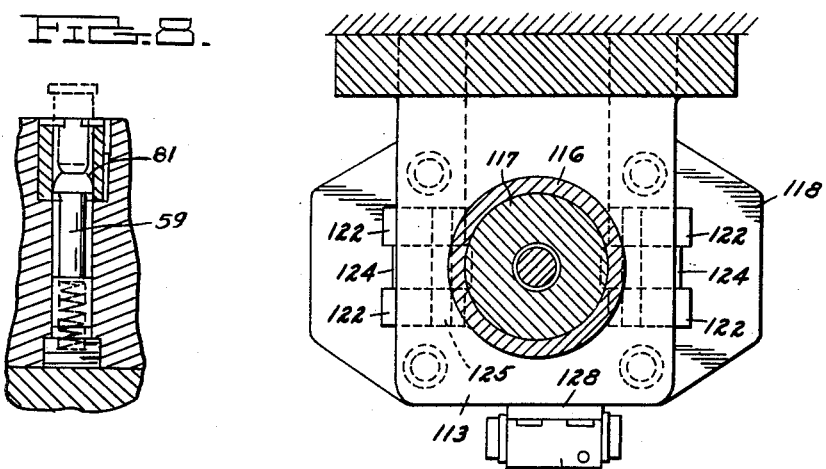
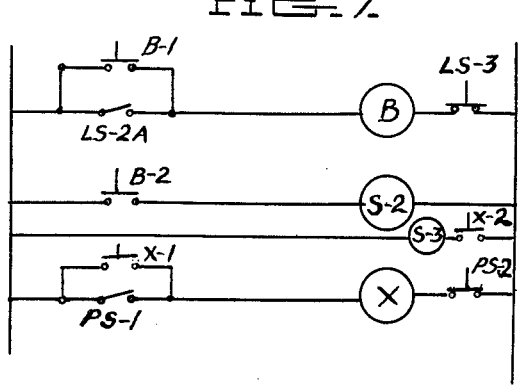
INVENTOR.
FREDERICK P. SHARPE
BY Whittemore,
Hulbert & Belknap
ATTORNEYS United States Patent Office 3,029,498
Patented Apr. 17, 1962

3,029,498
BEARING CUP ASSEMBLING MACHINE
Frederick P. Sharpe, Dearborn, Mich., assignor to Kelsey-Hayes Company, Detroit, Mich., a corporation of Delaware
Original application Apr. 8, 1957, Ser. No. 651,209, now Patent No. 2,983,999, dated May 16, 1961. Divided and this application Mar. 16, 1959, Ser. No. 799,531
7 Claims. (Cl. 29—201)

The present invention relates to a bearing cup assembling machine and refers more particularly to a machine for automatically fixedly inserting a pair of tapered bearing cups into opposite sides of the tubular portion of a wheel hub.

In keeping with the present trend toward automation in manufacturing, apparatus has been developed which automatically secures wheel hubs and brake drums together in assembly with a plurality of studs, inserts bearing cups into the wheel hubs, and unloads the assembled article of manufacture in a desired manner. Such apparatus is disclosed in applicant's co-pending case, Serial Number 651,209, filed April 8, 1957 now Patent No. 2,983,999 granted May 16, 1961 of which application the present application is a division. In such apparatus it is desirable that tapered bearing cups be automatically inserted into both sides of the wheel hubs at a specific time in a predetermined manner.

It is therefore one of the objects of the present invention to provide a machine for simultaneously assembling two bearing cups with a wheel hub.

Another object is to provide a machine for inserting tapered bearing cups into both sides of a wheel hub substantially simultaneously.

More specifically, it is an object to provide a machine including means for inserting a bearing cup under pressure into one side of a wheel hub and while pressure is still applied to the bearing cup inserting a second bearing cup under less pressure into the other side of the wheel hub.

Still more specifically, it is an object to provide a machine including means for inserting a tapered bearing cup having a predetermined orientation into one side of a wheel hub under pressure, means for subsequently inserting a second tapered bearing cup orientated oppositely to the first tapered bearing into the other side of the wheel hub under a lesser pressure while the pressure is maintained on the first bearing cup, and means thereafter to first remove the pressure from the second bearing cup and then to remove the pressure from the first bearing cup.

With these and other objects in view, the invention resides in the novel features of construction and combination of parts as more fully hereinafter set forth.

In the drawings:

FIGURE 4 is an elevational view, partly in section, looking in the direction of the arrow 4 in FIGURE 3.

FIGURE 5 is a sectional view taken on the line 5—5 of FIGURE 4.

FIGURE 6 is a view taken on line 6—6 of FIGURE 3.

FIGURE 7 is a schematic representation of the control system of the bearing cup assembling machine shown in FIGURES 1–6.

FIGURE 8 is a partial section view of the apparatus shown in FIGURE 1 and is similar to a portion of FIGURE 3 and illustrates a modified stud guiding and hub locating pin.

Figure 1:
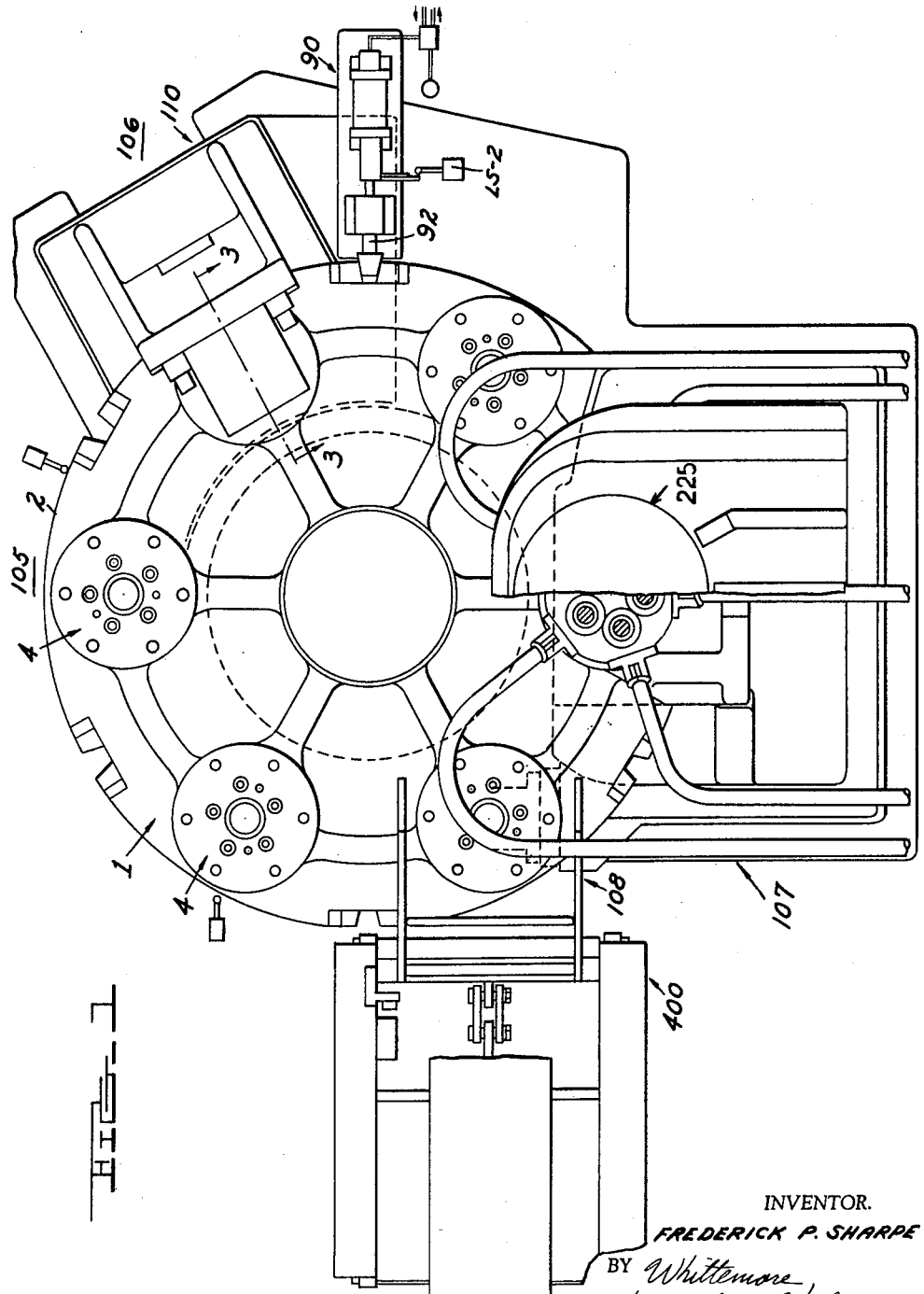
FIGURE 1 is a plan view of apparatus for the assembly of wheel hubs, brake drums, studs and bearing cups showing the relation of a bearing cup assembling machine according to the invention to the total apparatus.
Figure 2:
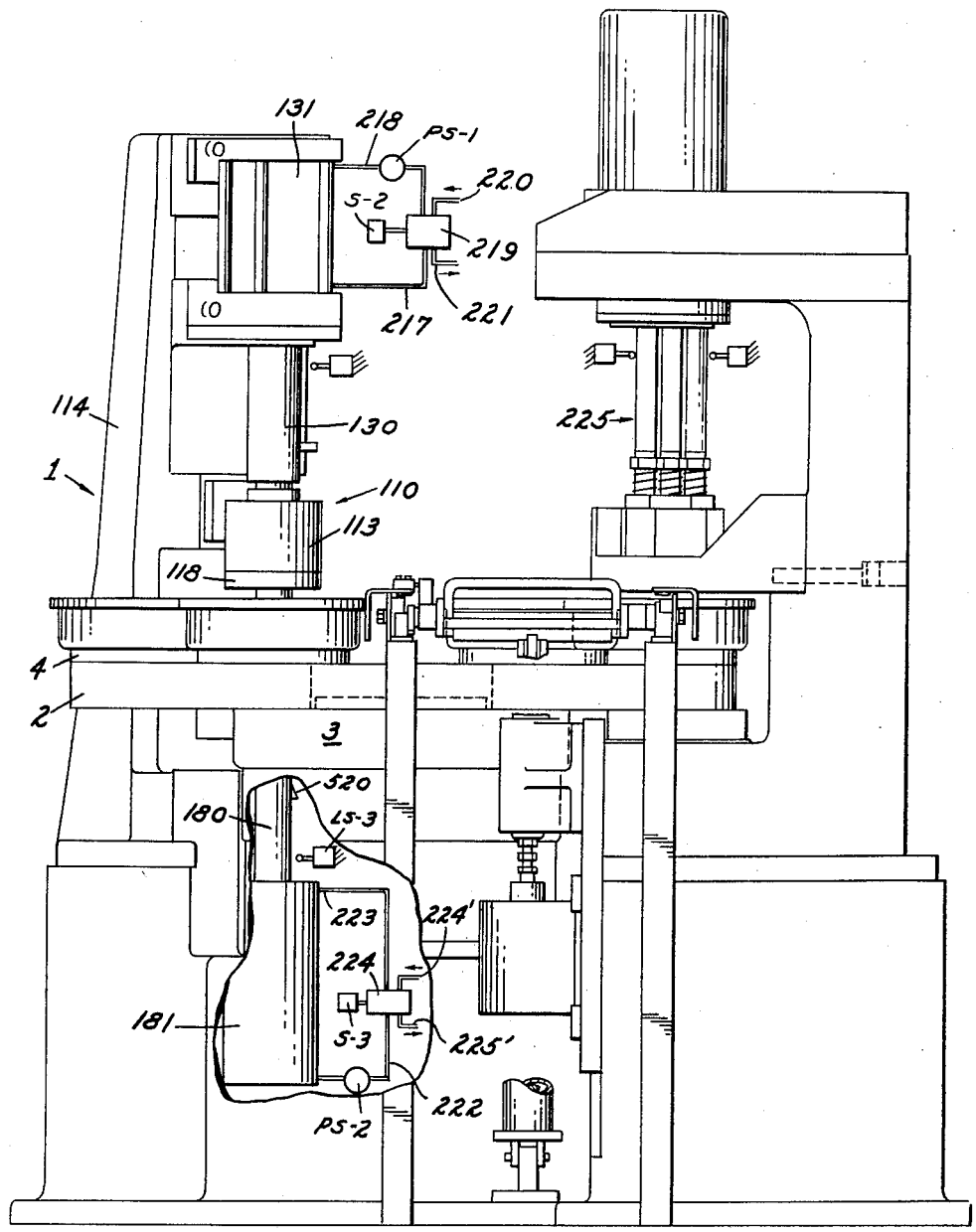
FIGURE 2 is a side elevation of the apparatus illustrated in FIGURE 1 partly broken away to show the control elements of the bearing cup assembling machine.

Referring more particularly to the drawings, apparatus for the assembly of wheel hubs, brake drums, studs and bearing cups is shown generally at 1 in FIGURES 1 and 2. The apparatus comprises a rotatable generally horizontally disposed turntable 2 supported for rotation on the frame structure 3. Six equally spaced supports 4 for brake drum and hub assemblies are provided around the periphery of table 2. A loading station 105 for brake drums and hubs, a bearing cup inserting machine 110 according to the invention at station 106, locking mechanism 90, a stud inserting machine 225 at station 107, and an unloading mechanism 400 at station 108 are also provided around the periphery of table 2 as shown in the complete assembly apparatus.

Figure 3:
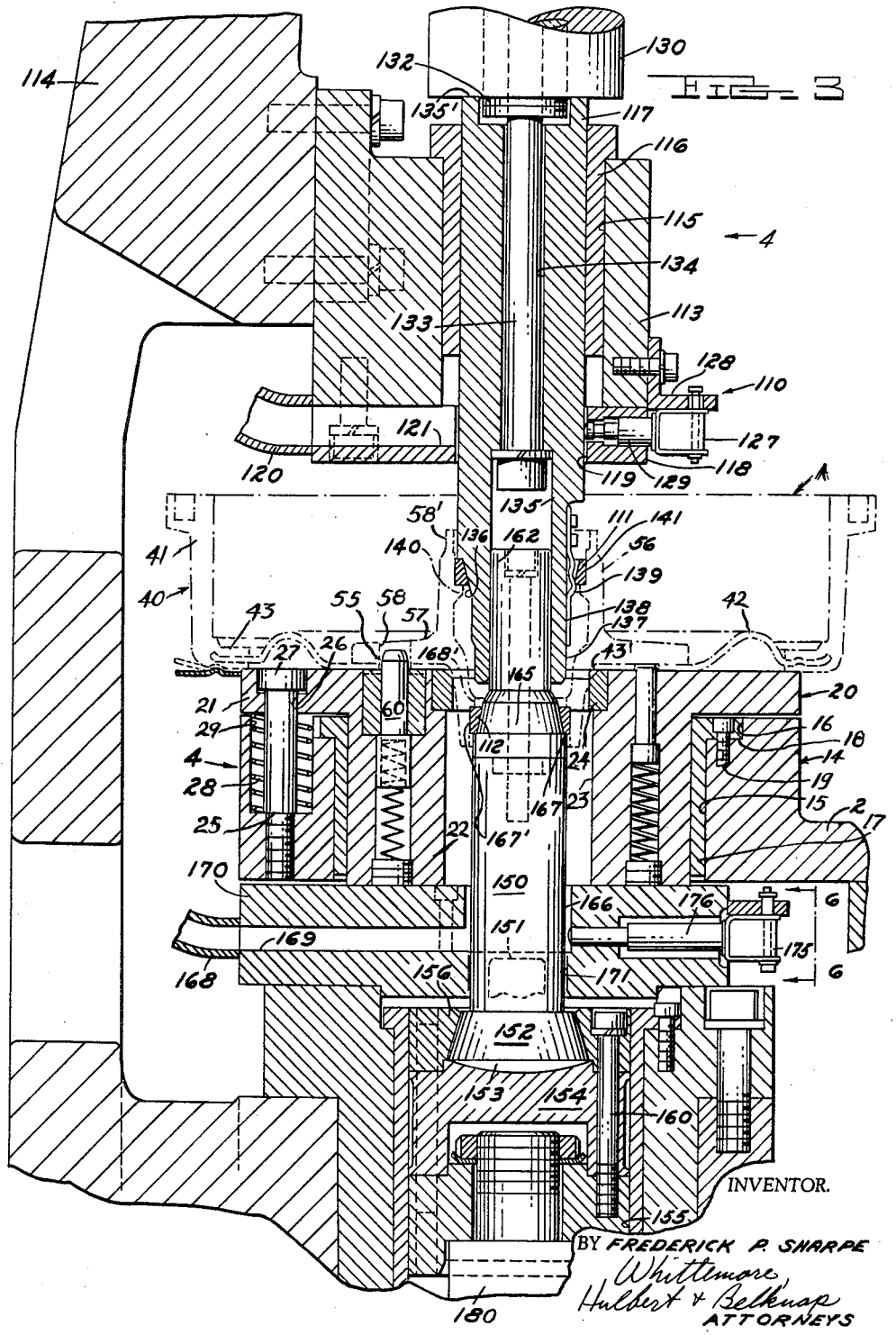
FIGURE 3 is an enlarged partial sectional view taken on line 3—3 in FIGURE 1 through the bearing cup assembling machine.

Each support 4 on the turntable comprises the integral circular enlargement 14 which projects upwardly from the turntable (FIGURE 3). Each enlargement 14 has a central passage 15 which extends vertically therethrough from the top of the enlargement to the bottom of the turntable, the passage being counterbored at the upper end as shown at 16. A tubular bushing 17 is supported in the passage 15 and has a flange 18 at the upper end disposed in the counterbored portion 16 of the passage and secured to the enlargement 14 by the fasteners 19. Each support 4 also includes a supporting member 20 having an upper circular portion 21 and a depending circular portion 22 of reduced diameter received in the tubular bushing 17 for vertical reciprocation therein. The supporting member 20 has the central vertical through passage 23 counterbored at the upper end to receive the supporting ring 24.

Each supporting member 20 is mounted on the enlargement 14 by an annular series of bolts 25. The shanks of the bolts threadedly engage the enlargement 14 so that the bolts are rigidly secured in position on the enlargements, and the upper ends of the bolts are slidably received in passages 26 in the supporting member 20. These passages 26 are counterbored at the upper end to slidably receive the enlarged heads 27 of the bolts. Coil springs 28 encircle each bolt shank and are disposed in recesses 29 in the enlargements 14 through which the bolt shanks extend, the springs being compressed between the bottoms of the recesses and the undersides of the circular portions 21 of the supporting members 20, normally urging the supporting members upwardly to a position in which the counterbored portions of passages 26 engage the undersides of the bolt heads 27. In FIGURE 3 the supporting members 20 are shown pressed downwardly from the upper limiting position against the action of the springs 28.

The brake drum 40 of each hub and drum assembly A has the cast annular brake flange 41 and the sheet metal web or back 42, the annular periphery of which is cast into the inturned portion 43 of the brake flange. The drum back 42 has a central opening 43' of approximately the same diameter as the inside of supporting ring 24.

Each drum back is also formed with a circular series of five apertures 55 which are spaced apart equal distances. The apertures 55 are provided to receive studs which secure the brake drum to the hub 56. The annular flange 57 of the hub is also provided with a circular series of apertures 58 located to register with the respective apertures 55 in the assembled relation of the hub and brake drum, and being of a very slightly smaller diameter than the apertures 55. Five pins 59 and 60 which are arranged in a circle in positions to register with the apertures 55 and 58 in the drum back and hub flange are also provided in supporting member 20 of each support 4. Four of the pins 60 are of identical construction as shown in FIGURE 3. The fifth pin 59 as shown in FIGURE 8 is provided with a narrow transversely elongated head 81 of a length greater than the diameter of the pin 59. Pins 60 and 59 serve as stud guides for the insertion of studs securing the brake drum and hub 56 together. Pins 60 and particularly pin 59 serve also to angularly locate the hub.

The tubular portion 58' of the hub extends through the central aperture in the drum back in assembled relation as shown in FIGURE 3. In this relation the hub is radially located by the supporting ring 24 which receives the tubular portion of the hub.

The bearing cup assembling machine 110 located at station 106 is shown best in FIGURES 3–6. The bearing cups to be assembled with the hub are indicated at 111 and 112 respectively. The upper bearing cup 111 is in the form of a circular annulus having a frusto-conical inner surface and a cylindrical outer surface. The bearing cup 112 is similarly formed although smaller in size.

The bearing cup assembling mechanism 110 includes a plunger guide block 113 bolted to the rigid frame member 114. The block 113 has a vertical through passage 115 in which is secured a tubular bushing 116 for guiding the upper bearing cup assembling plunger 117. A bearing cup supporting member 118 is secured to the bottom of the block 113 and has a vertical through passage 119 aligned with the vertical plunger 117 and slightly larger in diameter than the plunger. Bearing cups 111 are admitted to the supporting member 118 through the inclined chute 120 which communicates with the passage 121 in the supporting member 118 leading to the vertical passage 119 therein.

Referring to FIGURES 3, 4 and 5, the supporting member 118 has the diametrically opposed pairs of bosses 122 which project upwardly from the top of the supporting member and into suitable recesses 123 in the block 113. A bearing cup retaining dog 124 is associated with each pair of bosses, being pivotally supported therebetween on horizontal pins 125 which extend between the bosses of each pair. The dogs 124 are diametrically opposed and have inward projections 125' at the lower ends for supporting a bearing cup in the vertical passage 119. The dogs are resiliently urged toward one another by the spring pressed pins 126. The bearing cups 111 are slightly smaller in diameter than the passage 119.

A micro-switch 127 is secured to the block 113 by a bracket 128. The micro-switch has a plunger 129 which normally extends into the vertical passage 119 beyond the position illustrated in FIGURE 3 for engagement with a bearing cup 111 supported in the passage by the dogs 124. When thus engaged by a bearing cup, the pin 129 closes the micro-switch 127.

The vertical plunger 117 is connected to the piston rod 130 of the hydraulic piston-cylinder assembly 131 which is vertically disposed and secured to the rigid frame member 114. The piston-cylinder assembly 131 reciprocates the plunger between the lower position illustrated in FIGURE 3 and an upper position in which the lower end thereof is above the lower end of the supporting member 118. A plug 132 is threaded into piston rod 130 and the connecting bolt 133 is threaded into the plug. The bolt extends through an axial passage 134 in the plunger 117 and the bolt head engages the shoulder formed between the passage and the recess 135 at the lower end of the plunger. The upper annular end surface 135' of the plunger is clamped against the piston rod 130. This connection between the piston rod and plunger permits a slight universal wobble of the plunger to properly align itself in operation.

The lower end portion of the plunger is reduced in cross-section and has a semi-annular frusto-conical surface 136 of approximately the same radius, at the upper end thereof, as the inside of bearing cup 111. The frusto-conical portion 136 is connected to the upper generally cylindrical portion of the plunger 117 by a radial shoulder or seat. Diametrically opposite to the frusto-conical portion 136, the plunger 117 has a flat surface 137 upon which is secured a leaf spring 138 having a raised portion 139 adapted to engage under the bearing cup and retain it in position on the plunger. Thus, when the plunger moves downwardly from its upper limiting position, it will pick up the bearing cup supported by the dogs 124 and carry it down to the FIG. 3 position. The spring 138 will resiliently retain the bearing cup on the plunger during this movement.

The tubular portion of the hub 56 has an annular internal rib 140 connected to the cylindrical portion 141 thereabove by a radial shoulder. The diameter of the cylindrical portion 141 is substantially the same as the outside diameter of the bearing cup 111 so that the bearing cup will have a pressed fit with the cylindrical portion 141 when in the assembled relation illustrated in FIG. 3.

The lower plunger 150 is vertically reciprocable and aligned with plunger 117. It is shown in its upper limiting position in FIG. 3, and is retractable to its lower limiting position in which the upper extremity thereof assumes the dotted line position indicated at 151 in FIG. 3. The plunger 150 has an enlarged frusto-conical lower end portion 152, the spherically convex bottom surface 153 thereof engaging the spherically concave upper surface of the piston 154. The piston 154 is vertically reciprocable in the vertical guide passage 155, and the lower end portion 152 of the plunger is secured to the piston by a clamp 156. The clamp is annular and has a frusto-conical inner surface engageable with the frusto-conical annular side surface of the portion 152. The clamp 156 is secured to the piston 154 by bolts 160. The clamp somewhat loosely engages the portion 152 of the plunger to enable a limited universal angular movement of the plunger so that the plunger may align itself properly with the upper plunger 117.

The upper end portion of the plunger 150 is reduced to provide the cylindrical pilot 162 having approximately the same diameter as the cylindrical recess 135 in plunger 117 to enable the pilot to enter the recess and slide freely therein. The limited angular movement of the plunger 117 and 150 enables them to align properly and facilitates the movement of pilot 162 into the recess 135. The plunger 150 also has a frusto-conical surface 165 which is separated from the cylindrical main body portion 166 thereof by an annular shoulder 167. The frusto-conical portion 165 is approximately the same diameter as the inside frusto-conical surface of the bearing cup 112 so that the bearing cup may be supported upon the shoulder 167 in the position illustrated in FIG. 3.

The plunger 150 is adapted to press a cup 112 into the cylindrical surface 167' of the hub with a pressed fit against the seat defined by annular rib 168'.

The bearing cups 112 are delivered to the bearing cup assembling apparatus through a chute 168. The chute 168 communicates with passage 169 in the bearing cup supporting member 170, and the passage 169 leads to the vertical passage 171 in member 170. Member 170 is rigidly supported in fixed position beneath the turntable. Passage 171 is aligned with the plunger 150 to freely receive the latter. The diameter of the passage 171 beneath the connecting passage 169 is reduced to a diameter less than the outside diameter of the bearing cups 112 so that the bearing cups cannot drop through the reduced portion of passage 171 in the lower position of plunger 150. Member 170 serves as an anvil during insertion of the bearing cups, although springs 28 raise member 20 clear of member 170 for indexing.

A micro-switch 175 is provided having an actuating plunger 176 extending into the passage 171 above the reduced portion thereof for engagement with the bearing cups. Upon engagement of the plunger by a bearing cup, the limit switch 175 is closed.

The piston 154, which reciprocates the plunger 150, is connected to a rod 180 which in turn is connected to the piston of the vertically disposed hydraulic piston-cylinder assembly 181.

The operation of the bearing cup assembling machine will be considered in connection with FIGURE 7 which is a schematic representation of the control circuit therefor. This control circuit may be considered a part of a larger control circuit for the automatic operation of the complete apparatus shown in FIGURES 1 and 2.

In operation, a work support 4 carrying a brake drum and hub is rotated into registration with the bearing cup assembling station 106 in the indexed position of turntable 2 and the turntable is locked in indexed position by the locking pin 92 which advances and engages a registering recess 94 in the table. On indexing of table 2 a limit switch LS–2 is operated by advance of the locking pin 92 associated with locking device 90 or alternatively switch LS–2 may be hand operated to start the automatic cycle of the bearing inserting machine.

The limit switch LS–2 has a contact LS–2A (FIGURE 7) which momentarily closes with the momentary closing of limit switch LS–2, thereby energizing relay B. Relay B has a normally open contact B–1 which closes upon energization of the relay to seal it in. Relay B also has a contact B–2 which closes upon energization of relay B to energize solenoid S–2 (FIGURES 2 and 7). When solenoid S–2 is energized, it shifts the 4-way valve 219 from its normal position to a position in which hydraulic fluid from line 220 is directed to the upper end of the hydraulic cylinder 131 through line 218 and the lower end is exhausted through lines 217 and 221. The plunger 117 (FIGURE 3) is thereby moved downwardly from its normal retracted position above the bearing cup supporting member 118 to pick up a bearing cup 111 held by dogs 124 and press it into the tubular portion of the hub in the position illustrated in FIGURE 3 in which the bearing cup seats on the rib 140 and has a pressed fit with the cylindrical inner surface 141. When a predetermined pressure is reached in the line 218, sufficient to press cup 111 securely on its seat in the hub, the pressure switch PS–1 is momentarily closed thereby energizing the relay X to close its contact X–1 and seal in the circuit to the relay. The relay X also has a contact X–2 which is closed upon energization of the relay to energize solenoid S–3.

The energization of solenoid S–3 shifts the 4-way valve 224 from its normal position to a position in which hydraulic fluid from the pressure line 224′ is directed to the lower end of the assembly 131 through line 222 and the upper end is exhausted through lines 223 and 225′ to raise the plunger 150 from its retracted position shown at 151 in FIGURE 3 to pick up a bearing cup 112 and press it into assembled relation on the lower seat of the hub. The pilot 162 enters the recess 135 in the upper plunger and both plungers are capable of a limited wobble movement to align the plungers. The normally closed pressure switch PS–2 in line 222 momentarily opens when a predetermined pressure is reached to de-energize relay X and also solenoid S–3 so that the 4-way valve 224 may return to its normal position in which it directs hydraulic fluid under pressure to the upper end of assembly 181 and exhausts the lower end permitting retraction of the lower plunger 150. The pressure switch PS–2 has a lower setting than the pressure switch PS–1 so that the upper plunger 117 will press down upon the hub through bearing cup 111 with a substantially greater pressure than the pressure of the lower plunger 150 upwardly against the hub through bearing cup 111. Therefore the hub and drum assembly A will remain securely located on its support. By the time the predetermined pressure setting of switch PS–2 is reached, sufficient pressure has been applied against both bearing cups to firmly seat them upon their seats in the hub.

During the final stages of retraction of the lower plunger 150, the projection 520 on piston rod 180 engages, moves past and momentarily opens the normally closed limit switch LS–3 to de-energize relay B and solenoids S–2. As a result, the 4-way valve 219 returns to its normal position admitting fluid under pressure to the lower end of the assembly 131 and exhausting the upper end to retract the plunger 117. The projection 520 is spring urged outwardly and merely flexes past the limit switch LS–3 upon upward movement.

During the insertion of the bearing cups, the supporting member 20 is moved downwardly against anvil 170 by the greater pressure exerted by upper plunger 117. Normally the supporting members 20 are elevated clear of anvil 170 by springs 28 in order not to interfere with table indexing.

What I claim as my invention is:

1. Apparatus for assembling bearing cups on a tubular wheel hub having aligned axially spaced internal bearing cup seats facing away from each other in opposite directions axially of the hub, comprising a generally horizontal support for the hub adapted to support the latter with its axis generally vertical, a vertically reciprocable member, means supporting said member above the hub on said support for movement downwardly toward the hub on said support to press a bearing cup into assembled relation with the hub on one of the seats thereof and at the same time to press the hub more firmly against said support through the bearing cup, a second vertically reciprocable member, means supporting said second member beneath the hub on said support for movement upwardly toward the hub in opposition to said first-mentioned member to press another bearing cup into assembled relation with the hub on the other of the seats thereof, said members being movable along the same line and retractable away from the hub on said support, means for moving said first-mentioned member downwardly toward the hub under a predetermined force, means for subsequently moving said second member upwardly toward the hub under a predetermined force less than the first-mentioned predetermined force in response to the application of said first-mentioned predetermined force by said first-mentioned member, and means for retracting said second-mentioned member and thereafter said first-mentioned member, said first-mentioned member having an elongated tubular pilot portion coaxial with the supported hub adapted to enter the hub during movement of said first-mentioned member toward said support, and said second-mentioned member having an elongated pilot coaxial with the supported hub adapted to enter said tubular pilot portion during movement of said second member toward said support to align said members, at least one of said members being capable of limited lateral movement to enable said members to align and said pilot to enter said tubular pilot portion.

2. Apparatus as in claim 1 including means for advancing said support to and from a position between said reciprocable members for assembly of the bearing cups on the wheel hub as aforesaid, an anvil beneath said support at said position thereof between said reciprocable members to be engaged by said support and to thus support the same against the predetermined force of said first-mentioned member acting thereon, and spring means normally holding said support above the level of said anvil to facilitate movement of said support to and from said position.

3. Apparatus for assembling bearing cups on a tubular wheel hub having axially spaced internal bearing cup seats facing away from each other in opposite directions axially of the hub, comprising a support for the hub, a reciprocable member, means supporting said member for movement toward said support in one direction along the axis of the hub supported thereon to press a bearing cup into assembled relation with the hub on one of the seats thereof, a second reciprocable member, and means supporting said second reciprocable member for movement toward said support in the opposite direction along the axis of the hub supported thereon to press another bearing cup into assembled relation with the hub on the other of the seats thereof, said first-mentioned member having an elongated tubular pilot portion coaxial with the supported hub adapted to enter the hub during movement of said first-mentioned member toward said support, and said second-mentioned member having an elongated pilot coaxial with the supported hub adapted to enter said tubular pilot portion during movement of said second member toward said support to align said members.

4. Apparatus as in claim 3 in which at least one of said members is capable of limited lateral movement to enable said members to align and said pilot to enter said tubular pilot portion.

5. Apparatus for assembling bearing cups on a tubular wheel hub having aligned bearing cup seats facing away from each other, comprising a support for the hub, a reciprocable member, means supporting said member for movement along a straight line toward the hub on said support to an advanced position to press a bearing cup into assembled relation with the hub on one of the seats thereof and at the same time to press the hub more firmly against said support through the bearing cup, a second reciprocable member, means supporting said second member for movement along said straight line toward the hub on said support in opposition to said first-mentioned member to an advanced position to press another bearing cup into assembled relation with the hub on the other of the seats thereof, said members being retractable along said straight line away from said advanced positions thereof, means for moving said first-mentioned member toward the hub on said support to its advanced position under a predetermined force, means operative in response to the application of said first-mentioned predetermined force by said first-mentioned member for moving said second member toward the hub on said support to its advanced position under a predetermined force less than said first-mentioned predetermined force while said first-mentioned member remains in its advanced position under said first-mentioned predetermined force, and means for retracting said second member away from its advanced position and thereafter retracting said first-mentioned member away from its advanced position.

6. Apparatus for assembling bearing cups on a tubular wheel hub having aligned axially spaced internal bearing cup seats facing away from each other in opposite directions axially of the hub, comprising a generally horizontal support for the hub adapted to support the latter with its axis on a generally vertical line, a vertically reciprocable member, means supporting said member above the hub on said support for movement downwardly on said vertical line toward the hub on said support to an advanced position to press a bearing cup into assembled relation with the hub on one of the seats thereof and at the same time to press the hub more firmly against said support through the bearing cup, a second vertically reciprocable member, means supporting said second member beneath the hub on said support for movement upwardly along said vertical line toward the hub on said support in opposition to said first-mentioned member to an advanced position to press another bearing cup into assembled relation with the hub on the other of the seats thereof, said members being retractable along said line away from said advanced positions thereof, means for moving said first-mentioned member downwardly toward the hub on said support to its advanced position under a predetermined force, means operative in response to the application of said first-mentioned predetermined force by said first-mentioned member for moving said second member upwardly toward the hub on said support to its advanced position under a predetermined force less than the first-mentioned predetermined force while said first-mentioned member remains in its advanced position under said first-mentioned predetermined force, and means for retracting said second member downwardly from its advanced position and thereafter retracting said first-mentioned member upwardly from its advanced position.

7. Apparatus for assembling bearing cups on a tubular wheel hub having axially spaced bearing cup seats facing away from each other in opposite directions axially of the hub, comprising a support for the hub, a reciprocable member, means supporting said member for movement in one direction along the axis of the hub supported on said support to press a bearing cup into assembled relation with the hub on one of the seats thereof, a second reciprocable member, and means supporting said second reciprocable member for movement in the opposite direction along the axis of the hub supported on said support to press another bearing cup into assembled relation with the hub on the other of the seats thereof, said first-mentioned member having an elongated tubular pilot portion coaxial with the supported hub adapted to enter the hub during movement of said first-mentioned member in said one direction, and said second member having an elongated pilot coaxial with the supported hub adapted to enter said tubular pilot portion during movement of said second member in said opposite direction to align said members.

References Cited in the file of this patent
UNITED STATES PATENTS

| | | |
|---|---|---|
| 1,677,860 | Ferris | July 17, 1928 |
| 2,367,672 | Cosmo | Jan. 23, 1945 |
| 2,594,506 | Sharpe | Apr. 29, 1952 |
| 2,660,780 | Beck | Dec. 1, 1953 |
| 2,859,456 | Taylor | Nov. 11, 1958 |